United States Patent [19]

Messenger

[11] 4,252,329

[45] Feb. 24, 1981

[54] SEMI-UNITIZED SHAFT SEAL

[75] Inventor: Edward J. Messenger, Longview, Tex.

[73] Assignee: Garlock Inc., Longview, Tex.

[21] Appl. No.: 14,925

[22] Filed: Feb. 26, 1979

Related U.S. Application Data

[63] Continuation-in-part of Ser. No. 664,625, Mar. 8, 1976, Pat. No. 4,208,057.

[51] Int. Cl.³ .............................................. F16J 15/34
[52] U.S. Cl. ...................................... 277/37; 277/153
[58] Field of Search ................. 277/152, 153, 157, 35, 277/36, 37

[56] References Cited

U.S. PATENT DOCUMENTS

| 3,341,265 | 9/1967 | Paterson | 277/153 |
| 4,083,567 | 4/1978 | Thumm | 277/37 |

Primary Examiner—Robert I. Smith

[57] ABSTRACT

A two-part separable, semi-unitized shaft seal for sealing between a housing bore and a relatively rotatable shaft extending through the bore and comprising a metal wear sleeve member and a sealing member assembled onto the wear sleeve member for shipping and installation of the seal as a unitized seal. However, when the housing and shaft are disassembled, the wear sleeve remains on the shaft and the sealing member remains with the housing, whereby each part can be examined and replaced, if necessary, without discarding the entire seal. The wear sleeve press-fits onto the shaft and the sealing member forms an elastomeric interference fit in the housing bore.

14 Claims, 4 Drawing Figures

SEMI-UNITIZED SHAFT SEAL

CROSS-REFERENCE TO RELATED APPLICATIONS

This application is a CIP of copending application Ser. No. 664,625 filed Mar. 8, 1976 and now U.S. Pat. No. 4,208,057.

BACKGROUND OF THE INVENTION

1. Field of the Invention

This invention relates to shaft seals and in particular to an improved semi-unitized hub seal.

2. Description of the Prior Art

Shaft seals, including unitized hub seals are well-known in the prior art. Such prior art unitized hub-type shaft seals include a wear sleeve and a sealing element, the two pieces being unitized and one piece press-fitting onto the shaft (or axle) and the other piece having a ridged elastomeric O.D. interference fit into the housing. Such prior art unitized seals are installed by, for example, press-fitting it onto the axle and then installing the wheel hub onto the axle and seal with the elastomeric ridges of the seal sliding into the wheel hub bore. Upon removal of the wheel, the entire unitized seal remains on the axle and can be removed from the axle and the entire seal can be replaced if necessary. The interference fit between the wheel hub and the seal O.D. resists removal of the hub therefrom and additional force must be used in removal of the hub. Other prior art unitized seals are press-fitted into the wheel hub bore (and provide an interference fit on the axle) and the entire unitized seal remains in that wheel hub bore when the wheel is removed from the axle.

Such prior art unitized hub shaft seals are subject to a variety of disadvantages and problems. It is a primary object of the present invention to provide an improved hub-type shaft seal that overcomes various problems in the prior art.

It is a further object of the present invention to provide a semi-unitized shaft seal which is installed as a unit but which, when the wheel hub is removed from the shaft, one seal part stays with the wheel hub and the other part stays on the axle, allowing the wheel hub to be removed from the axle without resistance from the seal.

It is a still further object of the present invention to provide a two-part semi-unitized shaft seal that can be disassembled and each part examined for damage and wear, and replaced separately if necessary, in contrast to the prior art unitized seal which cannot be disassembled for inspection and which must be completely discarded and replaced if one part is damaged or worn.

It is a still further object of the present invention to provide a shaft seal having a sealing lip that runs on a smaller diameter wear surface whereby it will have a longer life than prior art shaft seals having a sealing lip that must run on a larger diameter wear surface.

It is another object of the present invention to provide a semi-unitized shaft seal with a sealing lip that more easily dissipates heat. It is a further object of the present invention to provide a semi-unitized shaft seal with a wear surface which is more accurately concentric than in the prior at shaft seals. It is a still further object of the present invention to provide a semi-unitized shaft seal that does not require an internal gasket, which gaskets are susceptable to being cut or damaged during manufacture and installation. It is another object of the present invention to provide, in certain embodiments, a semi-unitized shaft seal having positive and constant lubrication at the lip without requiring lubricant to go through, for example, holes or passageways to lubricate the sealing lip. It is a still further object of the present invention to provide a semi-unitized shaft seal that does not have metal parts that can interfere with each other during rotation.

It is another object of this invention to provide a semi-unitized shaft seal that has fewer metal parts, that allows the area directly over where the sealing lip contacts the wear sleeve to be continually flooded with oil to dissipate heat, and that has no area where dirt and water can become lodged or trapped.

SUMMARY OF THE INVENTION

A two-part, separable, semi-unitized hub-type shaft seal for sealing between a housing bore and a relatively rotatable shaft and including a metal wear sleeve member and a sealing member assembled onto the wear sleeve member. The wear sleeve includes a cylindrical wear sleeve portion and a radial flange, with the cylindrical portion adapted to press-fit onto a shaft. The sealing member includes a metal reinforcing ring and an elastomeric body bonded thereto. The elastomeric body includes: (a) an annular sealing lip in sealing contact with a wear surface of the cylindrical portion of the wear sleeve member, (b) an elastomeric O.D. layer adapted to provide an interference fit in the housing bore, and (c) an annular bumper ring extending axially into contact with the axially inner radial face of the radial flange of the wear sleeve member.

This seal can be stored, transported and installed as a unitized seal, however, it can be disassembled for inspection and replacement of either or both parts. Upon removal of the housing from the shaft (or axle) the sealing member stays with the housing while the wear sleeve stays with the shaft, whereby the seal of the present invention does not resist removal of the housing from the shaft.

BRIEF DESCRIPTION OF THE DRAWINGS

The present invention will be more fully understood by reference to the following detailed description thereof, when read in conjunction with the attached drawings wherein.

DETAILED DESCRIPTION OF THE INVENTION

Figures 1, 2:
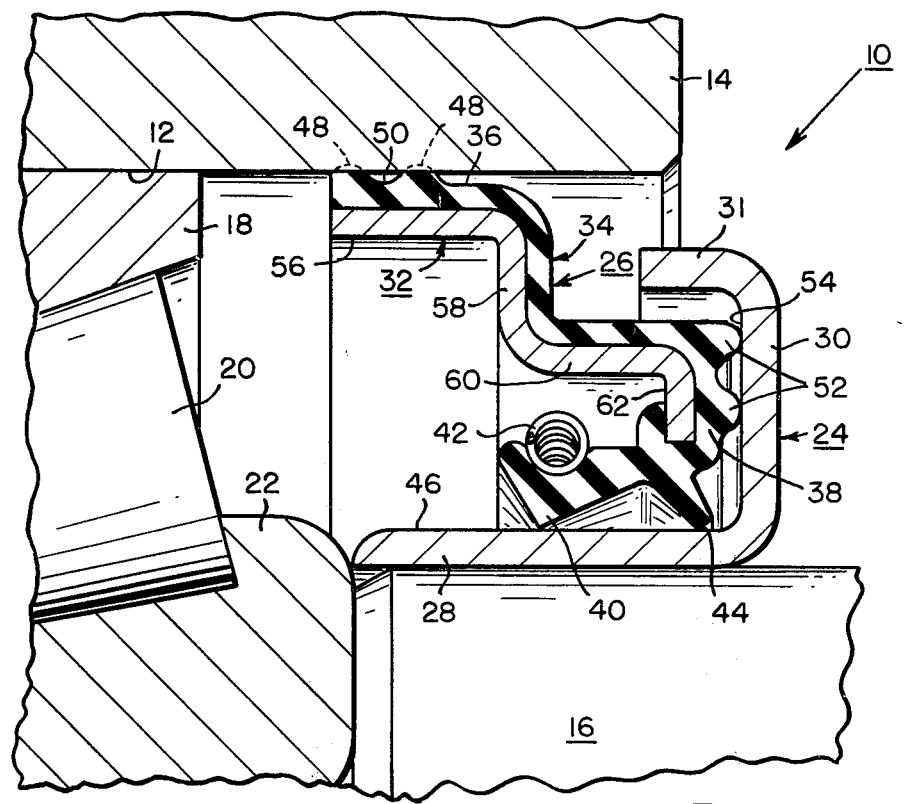
FIG. 1 is a fragmentary, partial cross-sectional view of one of the embodiments of the present invention shown installed between a housing bore and a shaft.
FIGS. 2–4 are each fragmentary, cross-sectional views of further embodiments of the present invention.

With reference now to the drawings, FIG. 1 shows a two-part, semi-unitized shaft seal 10 which functions to provide a seal between a bore 12, of a housing 14 and a shaft 16. As illustrated, the housing 14 can be a truck wheel hub and the shaft 16 can be a truck axle. Also shown between the housing 14 and shaft 16 is a bearing assembly which includes a cup 18, a roller 20, and a bearing cone 22.

The seal 10 comprises a metal wear sleeve 24 and a sealing member 26 which are assembled together to form the two-part, separable, semi-unitized device of this invention. The wear sleeve 24 includes a cylindrical portion 28 and a radial flange or deflector ring 30. The I.D. of the cylindrical portion 28 provides a press-fit onto the shaft 16. The radial flange 30 extends radially outwardly from the axially outer end of the cylindrical portion 28. The wear sleeve 24 also includes a cylindrical portion 31 that extends axially inwardly from the radially outer end of the radial flange 30. As shown in these drawings, the "axially outer" direction is the direction to the right, as will be understood by those skilled in the art. The wheel hub or housing 14 can be removed from the shaft 16 by axially pulling the housing off the shaft to the left as seen in FIG. 1.

The sealing member 26 includes a metal reinforcing ring 32 and an elastomeric body 34 bonded to the reinforcing ring 32. The elastomeric body 34 includes an O.D. layer 36, a bumper member 38, an annular primary sealing lip 40 with a garter spring 42, and an auxiliary lip 44. Both of the lips 40 and 44 are adapted for sealing engagement with an O.D. wear surface 46 of the cylindrical portion 28 of the wear sleeve 24. The O.D. layer 36 provides an interference fit with the bore 12 and is preferably provided with a pair of axially spaced-apart ridges 48 (the ridges 48 are also shown in FIG. 1 in their as-molded shapes by dotted lines) and with a groove 50 therebetween to partly accommodate the material of the ridges that is displaced during installation. Preferably, these ridges are designed so as to be displaced more than 50% of their height when installed.

The bumper member 38 comprises at least one annular ring 52 extending axially outwardly into contact with an inner radial face 54 of the radial flange 30 of the wear sleeve 24. Two or more such annular rings are generally preferred and two such rings are shown in FIG. 1.

The metal reinforcing ring 32 includes a first outer cylindrical portion 56 supporting the O.D. layer 36, a first radial flange 58 extending radially inwardly from the axially outer end of the portion 56, a second cylindrical portion 60 extending axially outwardly from the radially inner end of flange 58, and a second radial flange 62 extending radially inwardly from the axially outer end of portion 60, and supporting the bumper member 38 and the lips 40 and 44. The sealing member 26 is properly located axially with respect to the wear sleeve 24 by virtue of the bumper member 38.

Installation of the seal 10 is accomplished by a single tool (not shown) which facilitates use of the seal 10 as a unitary composite seal. The seal is installed on the shaft 16 as a unitary seal. The wheel hub or housing can then be installed on the shaft with the bore thereof sliding onto the elastomeric O.D. and forming an interference fit therewith. When the housing 14 is removed from the shaft 16, the sealing member 26 stays with the housing 14 while the wear sleeve 24 remains with the shaft 16. Thus, separation of the housing and shaft automatically disassembles the seal 10.

Figure 3:
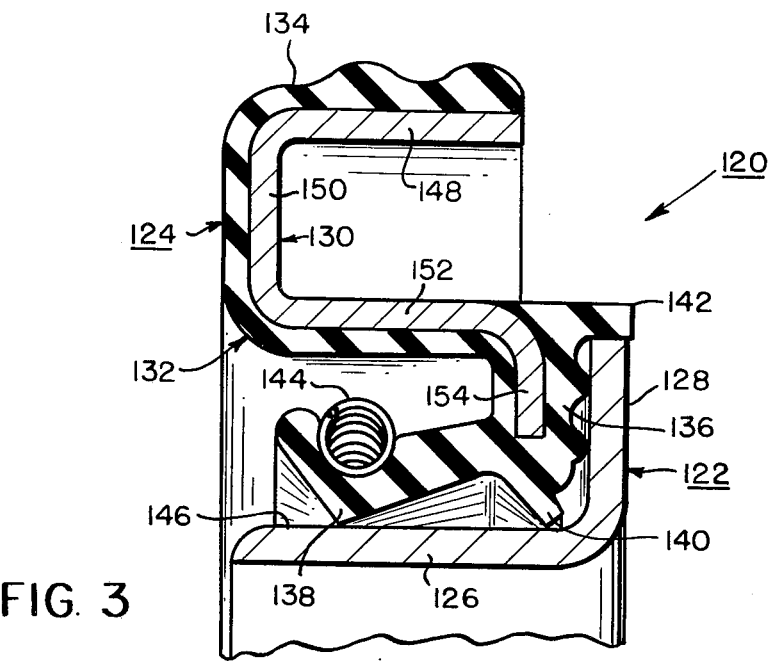
Figure 4:
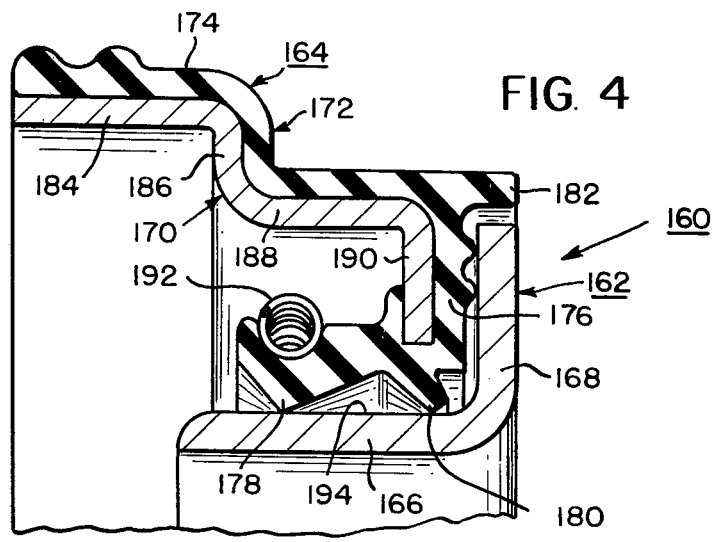

FIG. 2 shows a seal 70 according to another embodiment of the invention. For simplicity, FIGS. 2–4 do not show the shaft 16, housing 14, etc. shown in FIG. 1, however, it is to be understood that the seals in FIGS. 2–4 are used and installed in the same manner described above regarding the seal of FIG. 1. The seal 70 includes a wear sleeve 72 and a sealing member 74. The wear sleeve 72 has an inner cylindrical portion 76, a radial flange 78 and an outer cylindrical portion 80 which extends axially inwardly from the radially outer end of the radial flange 78. The wear sleeve 72 includes an O.D. wear surface 82 and the I.D. of the cylindrical portion 76 is designed to provide a press fit on a shaft.

The sealing member 74 includes a reinforcing ring 84 and an elastomeric body 86. The reinforcing ring 84 includes a first cylindrical portion 88, a first radial flange 90 which extends radially inwardly from the axially inner end of the first cylindrical portion 88, a second cylindrical portion 92 which extends axially outwardly from the radially inner end of the flange 90, and a second radial flange 94 which extends radially inwardly from the axially outer end of the portion 92.

The elastomeric body 86 has an elastomeric O.D. layer 96, a bumper member 98, a primary sealing lip 100 (including a garter spring 102), and an auxiliary lip 104. The O.D. layer 96 is adapted to form an interference fit with a housing bore and includes a plurality of circumferential ridges 106 and a groove 108 therebetween. During installation, these ridges 106 are displaced preferably about 50% of their height thereby establishing the interference fit. The bumper member 98 is adapted to contact an inner radial face 110 of the radial flange 78 and includes a plurality of annular rings 112 and a groove 114 therebetween. The lips 100 and 104 contact the wear surface 82 of the cylindrical portion 76 of the wear sleeve 72, as shown.

FIG. 3 shows a seal 120 including a wear sleeve 122 and a sealing member 124. The wear sleeve 122 includes a cylindrical portion 126 and a radial flange 128. The I.D. of the cylindrical portion 126 is adapted to form a press fit with a shaft. The radial flange 128 extends radially outwardly from the axially outer end of the cylindrical portion 126.

The sealing member 124 comprises a metal reinforcing ring 130 and an elastomeric body 132. The elastomeric body includes an O.D. layer 134, a bumper member 136, a primary sealing lip 138, an auxiliary lip 140, and an annular protective lip 142. The O.D. layer 134 includes ridges and grooves for the same purpose as described above with respect to seals 10 and 70. The bumper member 136 is provided with a plurality of annular rings which extend into contact with the adjacent inner radial surface of the radial flange 128. The lip 142 is adapted to engage the radially outer distal end of the flange 128 where it functions to aid in preventing entry of dirt and/or other foreign elements into the seal. The primary sealing lip 138 can have a garter spring 144 used therewith. The lips 138 and 140 are in sealing contact with an O.D. wear surface 146 of the cylindrical portion 126 of the wear sleeve 122.

The reinforcing ring 130 includes a first outer cylindrical portion 148 supporting the O.D. layer 134, a first radial flange 150 extending radially inwardly from the axially inner end of portion 148, a second cylindrical portion 152 extending axially outwardly from the radially inner end of the flange 150, and a second radial flange 154 extending radially inwardly from the axially outer end of the portion 152, and supporting the lip 142, the bumper member 136, and the lips 138 and 140.

FIG. 4 shows a seal 160 including a wear sleeve 162 and a sealing member 164. The wear sleeve 162 includes a cylindrical portion 166 and a radial flange 168 extending radially outwardly from the axially outer end of the cylindrical portion 166.

The sealing member 164 includes a metal reinforcing ring 170 of stepped configuration and an elastomeric body 172. The elastomeric body 172 includes an O.D. layer 174, a bumper member 176, a primary sealing lip 178 and an auxiliary lip 180. The body 172 can also include a further lip 182 similar to the lip 142 in the seal 120 of FIG. 3. The O.D. layer 174 is provided with a plurality of ridges and a groove as described above with reference to seals 10, 70 and 120. Also, the bumper member 176 is provided with a plurality of rings similarly as described above with reference to seals 10, 70, and 120.

The metal reinforcing ring 170 includes a first outer cylindrical portion 184 supporting the O.D. layer 174, a first radial flange 186 extending radially inwardly from the axially outer end of the portion 184, a second cylindrical portion 188 extending axially outwardly from the radially inner end of the flange 186, and a second radial flange 190 extending radially inwardly from the axially outer end of the portion 188, and supporting the bumper member 176, and the lips 178 and 180.

The primary lip 178 can use a garter spring 192 to urge the sealing lip 178 into sealing contact with an O.D. wear surface 194 of the wear sleeve 162.

The lips 142 (FIG. 3) and 182 (FIG. 4) can be either in contact with the distal end of the radial flange as shown in FIG. 3 or can be spaced therefrom as shown in FIG. 4.

The invention has been described in detail with particular reference to the preferred embodiments thereof, but it will be understood that variations and modifications can be effected within the spirit and scope of the invention as described hereinabove and as defined in the appended claims.

I claim:

1. A two-part, separable, semi-unitized shaft seal for providing a seal between a housing bore and a relatively rotatable shaft extending through the bore, said seal comprising:
   (a) a first part comprising a radially inner wear sleeve and a second part comprising a radially outer sealing member mounted on said wear sleeve such that said two-part seal can be transported and installed as a unitized seal,
   (b) said wear sleeve including a radially inner cylindrical portion and a radial flange extending radially outwardly from an axially outer end of said inner cylindrical portion, said inner cylindrical portion having an I.D. press-fit surface adapted to form a press-fit on a shaft and having an O.D. wear surface for the below-recited sealing lip;
   (c) said sealing member including a single reinforcing ring and an elastomeric body bonded to said reinforcing ring, said reinforcing ring having a radially outer cylindrical portion and a radially inner radial flange, and said elastomeric body including:
      (1) an annular primary sealing lip extending axially away from said radial flange and being in sealing contact with said wear surface,
      (2) a layer of elastomer bonded to the O.D. surface of said radially outer cylindrical portion of said reinforcing ring and adapted to form an interference fit in a housing bore, and
      (3) an elastomeric bumper member extending axially outwardly from said radial flange and into contact with the axially inner radial face of said radial flange of said wear sleeve, whereby said sealing member is movable axially onto and off of said wear sleeve and is assembled in semi-unitized relationship relative to said wear sleeve such that said wear sleeve and said sealing member are assembled together for shipping and installation as a unitized seal, and such that said sealing member is movable axially, with respect to said wear sleeve, away from and out of contact with said wear sleeve with said primary sealing lip being slidable axially inwardly off of said wear surface for disassembling said two-part, separable, semi-unitized shaft seal, wherein upon disassembly of a housing and shaft between which said seal is located, said wear sleeve and said sealing member also become disassembled with said wear sleeve staying with said shaft and with said sealing member staying with said housing.

2. The seal according to claim 1 including a garter spring in contact with a radially outer surface of said primary sealing lip for urging said primary sealing lip into contact with said wear surface.

3. The seal according to claim 1 wherein said elastomeric body also includes an auxiliary lip in sealing contact with said wear surface and extending axially in the opposite direction from that of said primary sealing lip.

4. The seal according to claim 1 wherein said wear sleeve includes an outer cylindrical portion extending axially inwardly from the radially outer end of said radial flange of said wear sleeve.

5. The seal according to claim 1 wherein said elastomeric body includes an axially outwardly extending lip located radially outwardly of said bumper member and of the radially outer end of said radial flange of said wear sleeve.

6. The seal according to claim 1 wherein said primary sealing lip extends axially inwardly and said auxiliary lip extends axially outwardly.

7. The seal according to claim 1 where said layer of elastomer for forming an interference fit includes a plurality of circumferential spaced-apart annular ridges.

8. The seal according to claim 1 wherein said reinforcing ring includes two cylindrical portions and two radial flanges.

9. The seal according to claim 1 wherein said reinforcing ring includes a first cylindrical portion, a first radial flange extending radially inwardly from the axially outer end of said first cylindrical portion, a second cylindrical portion extending axially outwardly from the radially inner end of said first radial flange and a second radial flange extending radially inwardly from the axially outer end of said second cylindrical portion, wherein said radially outer cylindrical portion is said first cylindrical portion and wherein said radially inner radial flange is said second radial flange.

10. The seal according to claim 9 wherein said wear sleeve includes an outer cylindrical portion extending axially inwardly from the radially outer end of said radial flange of said wear sleeve.

11. The seal according to claim 9 wherein said elastomeric body includes an axially outwardly extending lip located radially outwardly of said bumper member and of the radially outer end of said radial flange of said wear sleeve.

12. The seal according to claim 1 wherein said reinforcing ring includes a first cylindrical portion, a first radial flange extending radially inwardly from an axially inner end of said first cylindrical portion, a second cylindrical portion extending axially outwardly from a radially inner end of said first radial flange, a second radial flange extending radially inwardly from an axially outer end of said second cylindrical portion, wherein said radially outer cylindrical portion is said first cylindrical portion, and wherein said radially inner radial flange is said second radial flange.

13. The seal according to claim 12 wherein said wear sleeve includes an outer cylindrical portion extending axially inwardly from the radially outer end of said radial flange of said wear sleeve.

14. The seal according to claim 12 wherein said elastomeric body includes an axially outwardly extending lip located radially outwardly of said bumper member and of the radially outer end of said radial flange of said wear sleeve.

* * * * *